United States Patent [19]

Anderson et al.

[11] Patent Number: 4,660,649

[45] Date of Patent: Apr. 28, 1987

[54] ROTARY TILLER TOOL APPARATUS WITH VERTICAL LIFT FORCE VARIABLE IN DIRECT PROPORTION TO PRESSURE TO ROTATE TILLER TOOL

[76] Inventors: Jack F. Anderson, Marion, N. Dak. 58466; Clayton Melrose, Oaks, N. Dak. 58474

[21] Appl. No.: 684,843

[22] Filed: Dec. 21, 1984

Related U.S. Application Data

[62] Division of Ser. No. 240,137, Mar. 3, 1981, Pat. No. 4,491,183.

[51] Int. Cl.$^4$ .......................................... A01B 63/111
[52] U.S. Cl. .......................................... 172/2; 60/426;
   60/484; 172/75; 172/125
[58] Field of Search .................... 172/2, 3, 4, 7, 10,
   172/38, 75, 98, 114, 117, 123, 125, 239, 9, 463;
   56/10.2, 14.9, 15.1, 15.2; 91/530, 464; 60/426,
   484

[56] References Cited

U.S. PATENT DOCUMENTS

| | | | |
|---|---|---|---|
| 2,871,963 | 2/1959 | Harris et al. | 172/9 X |
| 3,548,570 | 12/1970 | Knott et al. | 172/4 X |
| 3,924,656 | 12/1975 | Hanser et al. | 91/464 X |
| 3,973,398 | 8/1976 | Kittle | 60/484 X |
| 4,170,113 | 10/1979 | Kittle et al. | 60/484 X |
| 4,359,831 | 11/1982 | Beeley | 172/125 X |

FOREIGN PATENT DOCUMENTS 459888 10/1950 Italy ........................................ 172/463

Primary Examiner—Richard T. Stouffer
Attorney, Agent, or Firm—James R. Young

[57] ABSTRACT

A retractable in-row tiller device is adapted for mounting on a movable vehicle and for tilling the ground around and between objects in a row. An outrigger arm with a rotary tiller mounted on its distal end is retracted inwardly and extended outwardly by a trapeze-type control arm which amplifies the velocity and magnitude of reciprocal motion produced by a hydraulic ram to move around and avoid objects encountered in the row. Both manually and automatically operable controls are included respectively to allow an operator to retract and extend the tiller out of and into the row as desired and to cause the tiller to be retracted and extended out of and into the row automatically upon encountering an object in the row. Manual control is also provided for the operator to override the automatic retraction control.

A lift mechanism for lifting the tiller out of the ground and a rotary drive for rotating the tiller are interrelated such that the vertical lift force is variable in relation to the force required to rotate the tiller. The ratio between the lifting force and the rotary drive is adjustably variable to effect automatic depth control for ground penetration.

3 Claims, 16 Drawing Figures

ROTARY TILLER TOOL APPARATUS WITH VERTICAL LIFT FORCE VARIABLE IN DIRECT PROPORTION TO PRESSURE TO ROTATE TILLER TOOL

This is a division of application Ser. No. 240,137, filed Mar. 3, 1981, now U.S. Pat. No. 4,491,183.

BACKGROUND OF THE INVENTION

The present invention relates generally to tiller apparatus, and more particularly to a novel and improved rotary tiller adapted for tilling interstitial unplanted soil between plants or objects in a row.

Cultivating or tilling the interstitial unplanted soil between plants in a row to control weed growth, mulch, and aerate the soil is desirable for optimum plant growth and good husbandry. In the past, such tilling between plants in a row was accomplished by manual labor, such as the use of hoes. The cost of manual labor and the vastly increased sizes of crops and trees planted in rows in modern times as well as the desire for more convenience has rendered manual labor for such tasks obsolete.

Tilling the area between adjacent rows is easily accomplished mechanically with machines or cultivators mounted on tractors and the like. However, such conventional machines are usually not effective for tilling the soil between the plants in a row because the machines are too large and cumbersome to steer into and out of the typically limited space between the plants in a row without disturbing the plants. Consequently, a number of tiller machines have been devised for mounting on mobile vehicles such as tractors and adapted for moving into and out of the space between plants in a row in order to accommodate tilling the ground between the plants in a row while the tractor continues in a substantially straight course parallel to the row.

The following patents disclose examples of such devices which include some mechanism for moving tiller apparatus laterally in relation to the tractor into and out of the area between plants in a row: U.S. Pat. No. 2,489,633 issued to Fulgham; U.S. Pat. No. 2,664,802 issued to I. Myer; U.S. Pat. No. 2,718,836 issued to E. P. Pertics, et al; U.S. Pat. No. 2,764,077 issued E. P. Pertics, et al; U.S. Pat. No. 3,059,704 issued to Kasatkin; U.S. Pat. No. 3,117,632 issued to V. G. Caggiano, Jr.; U.S. Pat. No. 3,138,208 issuued to S. G. Simms; U.S. Pat. No. 3,190,364 issued to Maloney; U.S. Pat. No. 3,200,890 issued to Courtway, and U.S. Pat. No. 3,913,681 issued to W. D. Lincoln, et al. While all of these devices have enjoyed various degrees of success in effectively tilling the areas between plants in a row, there are still a number of drawbacks associated with them and problems that have not been solved heretofore. The prior art devices typically include cumbersome mechanical controls for extending and retracting a tiller into and out of the row. The U.S. Pat. No. 2,489,633 issued to Fulgham, U.S. Pat. No. 3,138,208 issued to Simms, and U.S. Pat. No. 3,200,390 issued to Courtway are examples of such devices that utilize various mechanical apparatus for extending and retracting a tiller into and out of a row. The Myer patent, U.S. Pat. No. 2,664,802 utilizes an electric solenoid mechanism for extending and retracting a tiller into and out of row. The U.S. Pat. No. 2,718,836 issued to Pertics et al, U.S. Pat. No. 2,764,077 issued to Pertics et al, U.S. Pat. No. 3,059,704 issued to Kasatkin, U.S. Pat. No. 3,913,681 issued to Lincoln et al all include hydraulic controls. The apparatus of the mechanically and electrically controlled tiller devices are cumbersome, and even the prior art hydraulically controlled tillers usually lack effective, sensitive, response and speed of travel in retracting and extending into the row.

While some of the prior art devices, such as those disclosed in U.S. Pat. No. 2,489,633 issued to Fulgham, U.S. Pat. No. 2,664,802 issued to Myer, U.S. Pat. No. 3,117,632 issued to Caggiano, U.S. Pat. No. 3,138,208 issued to Simms, U.S. Pat. No. 3,200,890 issued to Courtway, and U.S. Pat. No. 3,913,681 issued to Lincoln et al include sensing apparatus for sensing the plants and causing the tiller apparatus to move around the plants, such devices are lacking in specific desirable features such as accurate response to objects sensed, effective speed of response in retracting and extending a tiller out of and into the row, and sufficient manual control options to allow the operator flexibility in dealing with various sized weeds and other objects that might be encountered in the row in addition to the plants. For example, none of the prior art retractable tillers equipped with sensor apparatus include an effective combination of features to avoid destroying plants that are too small or weak to activate the sensors to retract the tiller from the row and to keep the tiller in the row to destroy weeds or other unwanted plants that are large enough to activate the sensors that cause the tillers to be retracted out of the row.

Another feature lacking in the prior art retractable tillers is effective depth control to keep the rotary tillers penetrating the soil at a desired depth while avoiding gouging deeply into the soil or lifting out of the soil as the tractor moves over uneven terrain in relation to the terrain of the soil between the plants being tilled. It should be noted in this regard that the rotary tillers disclosed in U.S. Pat. No. 3,117,632 issued to Caggiano, U.S. Pat. No. 3,190,364 issued to Maloney, and U.S. Pat. No. 3,200,890 issued to Courtway have dish-shaped rotors for riding the surface of the ground with short, rigid teeth extending downwardly therefrom. Such short rigid teeth apparatus, however, are ineffective in wet soil conditions where they ball up and in vine-type weeds where they wrap up.

In summary, while there have been a number of prior attempts to solve the problems of tilling soil between plants in a row, there is still a need for improved retractable tiller apparatus that is simple, accurate in sensing, swift in response, versatile in control options, and effective in maintaining optimum penetration depth control.

SUMMARY OF THE INVENTION

Accordingly, it is an object of the present invention to provide novel, improved, and practical retractable tiller apparatus adapted for mounting on a movable vehicle and for tilling the interstitial unplanted soil around and between objects in a row as the vehicle moves parallel to the row.

It is also an object of the present invention to provide retractable in-row tiller apparatus having an operating mechanism capable of swiftly and accurately moving the tiller into and out of a row.

A further object of the present invention is to provide automatic depth control for in-row riller appatus wherein the downward forces acting on the tiller are balanced by vertical components of an upward force applied by hydraulic fluid pressure.

A still further object of the present invention is to provide penetration depth control for tiller apparatus wherein a vertical upward balancing force component applied to the tiller is varied automatically in proportion to the power required to move the tiller in the ground.

Yet another object of the present invention is to provide penetration depth control for a tiller wherein a vertical force component is applied to the tiller in relation to the power requirement for moving the tiller and wherein the ratio of variation in vertical force component in relation to the power requirement is adjustable.

The retractable rotary tiller device of the present invention has a rigid outrigger arm extending outwardly from the side of a tractor or vehicle with a rotary tiller mounted on the distal end of the outrigger arm. The outrigger arm is connected to the vehicle by a pivotal trapeze-like control arm, one end of which is pivotally connected to the vehicle and the other end of which is pivotally cOnnected to the outrigger arm. A first hydraulic cylinder and ram is connected to the control arm for pivoting the control arm in relation to the vehicle for extending and retracting the arm out of and into a row and a second hydraulic cylinder and ram is connected to the control arm and to the outrigger arm for pivoting the outrigger arm in relation to the control arm for raising and lowering the outrigger arm.

The tiller apparatus of the present invention also includes an integrated hydraulic control system for both manually and automatically operating a hydraulic motor for turning the rotary tiller as well as the hydraulic cylinder and ram for raising and lowering the outrigger arm and for controlling the depth of the tiller and the hydraulic cylinder and ram for retracting and extending the outrigger arm and the rotary tiller out of and into a row of plants. More specifically, the integrated hydraulic control system accommodates manually turning on and off and reversing the rotation of the rotary tiller head, raising and lowering the outrigger arm and tiller head, and retracting and extending the outrigger arm in relation to the vehicle out of and into a row of plants. In addition, a sensor is provided to detect the presence of an object or plant in proximity to the rotor and to cause the outrigger arm to be retracted automatically and then extended automatically back into the row when the plant has been passed by the rotary tiller. Further, the depth to which the tiller is allowed to penetrate the soil is automatically controlled by the hydraulic circuit in relation to the power required to rotate the tiller head in the soil. The novel design of the hydraulic control system of the present invention also allows an operator to override manually the automatic retraction and extension feature both to cause retraction and extension in the absence of any objects sensed by the sensor device as well as to prevent retraction in spite of detection of a plant or object in the path of the tiller by the sensor device.

An additional feature of a positive depth control plate to prohibit penetration of the rotor teeth beyond a predetermined depth is also provided. This positive depth control plate is in the form of a convex dish-shaped rotor plate positioned between the teeth of the rotor and adapted to contact and ride on the surface of the ground in fixed vertical relation to the tiller teeth.

Alternative embodiments include the provision of tiller heads adapted to cover a wider area. The wider tiller heads are comprised of two spaced-apart parallel chain segments with tiller teeth attached to and depending downwardly therefrom for tilling the ground in opposite directions to each other.

BRIEF DESCRIPTION OF THE DRAWINGS

Other objects, advantages, and capabilities of the present invention will become apparent as the description proceeds taken in conjunction with the accompanying drawings, in which.

DETAILED DESCRIPTION OF THE PREFERRED EMBODIMENT

Figure 1:
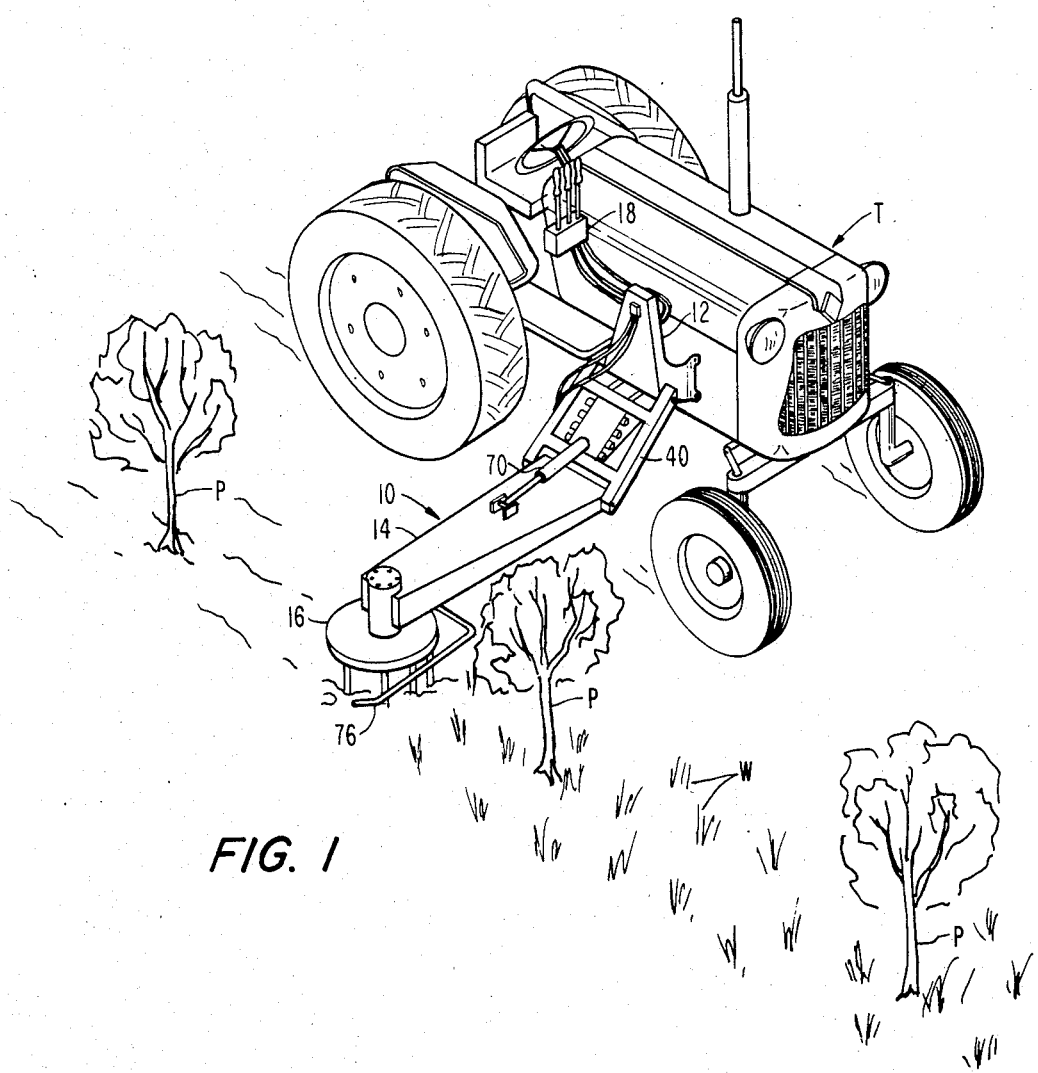
FIG. 1 is a perspective view of the retractable in-row tiller apparatus of the present invention mounted on the side of a tractor and shown tilling the soil between plants in a row.

The retractable tiller device 10 of the present invention is shown in FIG. 1 mounted on the side of a tractor T. Essentially, the retractable tiller apparatus 10 is comprised of an outrigger arm 14 which extends laterally outward from the side of the tractor T, a rotary tiller head 16 mounted at the distal end of the outrigger arm 14, a mounting frame 12 physically attached to the tractor T, and a trapeze-type extension and retraction assembly 40 pivotally mounted on the mounting frame 12 and pivotally attached to the outrigger arm 14 for retracting the outrigger arm 14 and tiller head 16 toward and away from the tractor T, as will be described more fully below.

Figure 2:
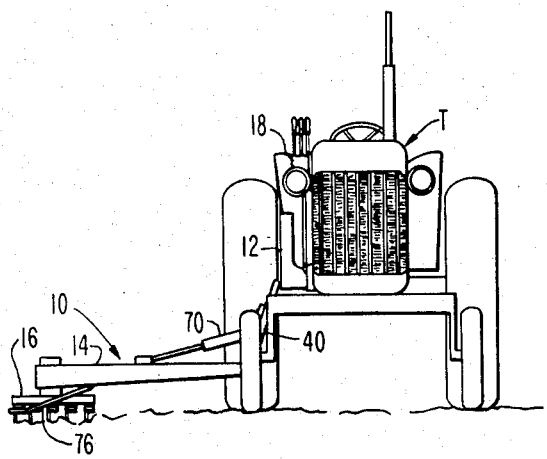
FIG. 2 is a front elevation view of the retractable in-row tiller apparatus of the present invention mounted on a tractor and showing the tiller in lowered position for tilling the soil.
Figure 4:
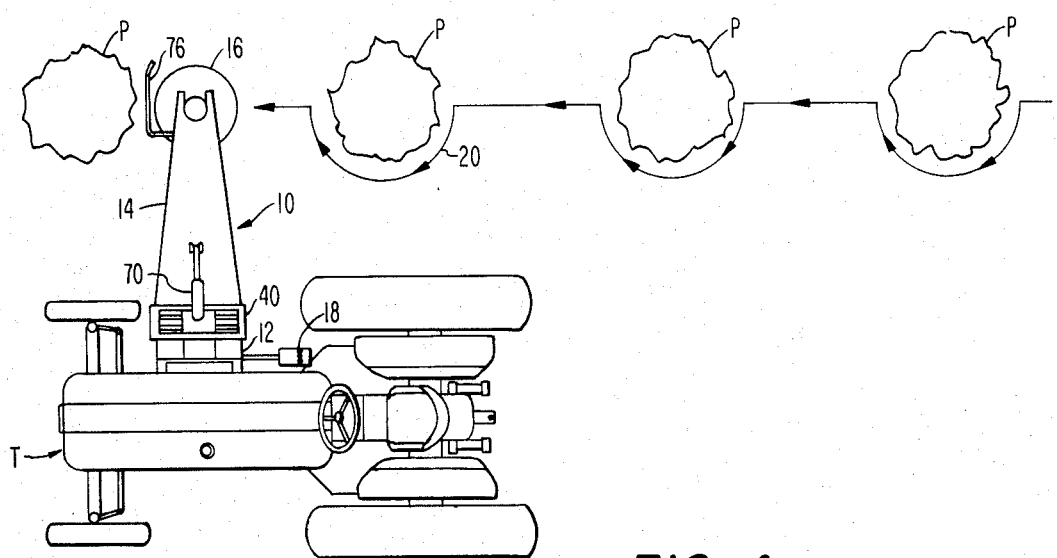
FIG. 4 is a plan view of the retractable in-row tiller apparatus of the present invention mounted on the side of a tractor and showing the outrigger and tiller head in lowered position tilling the soil between plants in a row.

As shown in FIGS. 1, 2, and 4, the outrigger arm 14 extends outwardly from the side of the tractor T in a substantially horizontal position above the ground when the tiller head 16 is in position to till the ground. As the tractor T travels substantially parallel to a row of plants P, the rotary tiller head 16 can till the interstitial soil between the plants P. As the tiller head 16 approaches a plant P, the extension and retraction assembly 40 pulls the outrigger arm 14 and tiller head 16 inwardly toward the tractor T a sufficient distance to allow the tiller head 16 to pass around plants P as shown in FIG. 4. When the tiller head 16 has safely passed around a plant P the extension and retraction assembly 40 extends the outrigger arm 14 and tiller head 16 outwardly away from the tractor T and back into the row between the plants P to continue tilling the soil between the plants P. Consequently, the tiller head 16 follows a path substantially as that shown by the arrows 20 in FIG. 4 to till the soil and cultivate out weeds W between and around the plants P as also shown in FIG. 1.

The retractable tiller apparatus 10 of the present invention includes a novel hydraulic control system for controlling the various movements and operations of the tiller apparatus 10. The extension and retraction of the outrigger arm 14 and tiller head 16 can be controlled manually by a valve in valve bank 18, or these functions can be controlled automatically by a sensor feature, including the sensor arm 76, which is adapted to feel the presence of a plant P in proximity to the rotor head 16. Upon detecting the presence of a plant P, the automatic sensor and retraction valve is actuated to cause the trapeze arm 14 and rotary tiller head 16 to be retracted from the row to proceed around the plant P without damaging the plant. The hydraulic operating system also allows an operator to manually override the automatic retraction feature to prevent the retraction of the rotary tiller 16 from the row if desired. This feature is particularly beneficial where the sensor 76 of the rotary tiller might encounter a large weed or other object that would under normal circumstances cause the tiller head 16 to be retracted out of the row to move around such an object. With the manual override feature provided in this invention, the operator can prevent the retraction of the rotary tiller head 16, thereby causing the tiller to cultivate over the large weed or other object and destroy it. This feature has been found to be quite useful in initial tilling operations wherein large weeds have grown to a size comparable to or larger than the plants in the row being tilled.

The hydraulic operating system of the present invention also includes an automatic depth control feature to keep the tiller head 16 tilling the ground at a desired penetration depth without gouging into the soil or raising out of the soil as the tractor moves over uneven terrain. This automatic depth control function is accomplished by the combination of the weight of the outrigger arm 14 and tiller head 16 acting to force the tiller head 16 into the soil and a counter-acting vertical component of lift force applied to the outrigger arm 14 by the hydraulic ram 72. The magnitude of the vertical force component applied to the outrigger arm 14 by the hydraulic ram 72 is varied in direct relation to the amount of hydraulic pressure or power required to rotate the tiller head 16 in the soil, as will be described in more detail below.

Figure 3:
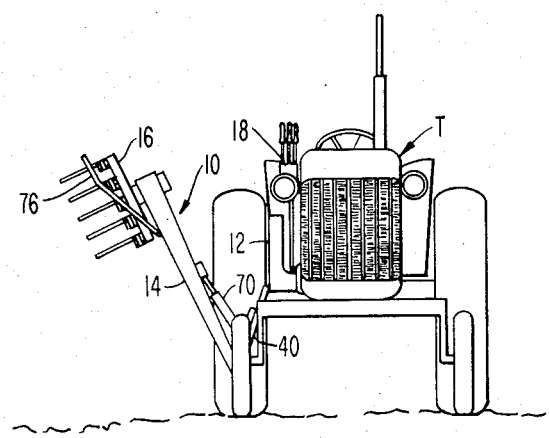
FIG. 3 is a front elevation view of the retractable in-row tiller apparatus of the present invention mounted on the side of tractor and showing the outrigger arm and tiller head in raised position.

The hydraulc cylinder 70 and ram 72 also function to raise the tiller head 16 completely out of the ground as shown in FIG. 3 for transportation where tilling is not desired.

The manual controls are conveniently mounted in a valve bank 18 near the operator's seat on the tractor T. All of the automatic and manual operating features mentioned above will be described below in further detail.

Referring to FIGS. 5, 6, 7, and 8, the structure of the preferred embodiment of the retractable tiller device 10 of the present invention will now be described in more detail. The mounting frame 12 includes a mounting plate 32 that can have any configuration appropriate for mounting the tiller device 10 on a desired tractor T or other vehicle. The frame housing 34 is attached to the mounting plate 32, and it includes a horizontal portion 36 and a vertical portion 38. The frame housing 34 is preferably in a rigid, unitary embodiment.

The extension and retraction assembly 40 is comprised of a trapeze carriage frame 42 pivotally mounted on the outer, lower corner of the mounting frame 12 with an upper mounting shaft 52. The trapeze carriage 42 extends generally downwardly from the upper mounting shaft 52, and its lower end is pivotally mounted to the inward end of the outrigger arm 14 with lower mounting shaft 54.

Figure 6:
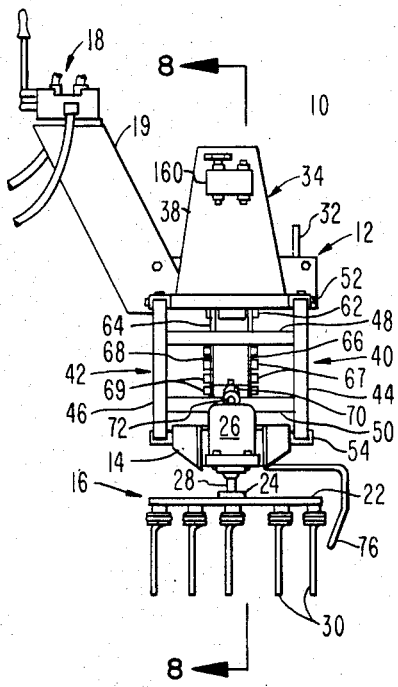
FIG. 6 is a side elevation view of the retractable in-row tiller apparatus of the present invention.

The trapeze carriage frame 42 includes two parallel spaced-apart vertical frame sections 44, 46 rigidly attached together by two parallel spaced-apart cross frame pieces 48, 50, as best seen in FIG. 6. The upper mounting shaft 52 is rigidly attached to the lower end of frame housing 34, and the upper ends of vertical frame sections 44, 46 are respectively journaled to pivot on opposite ends of upper mounting shaft 52. The lower mounting shaft 54 is rigidly attached to the inward end of the outrigger arm 14 and the lower ends of the vertical frame sections 44, 46 are respectively journaled to pivot on opposite ends of the lower mounting shaft 54.

Figure 8:
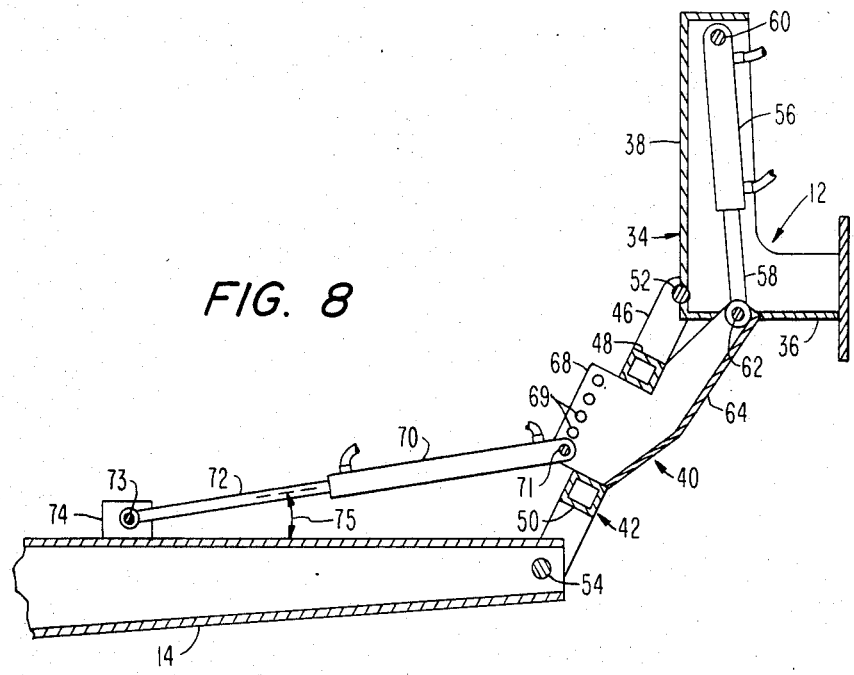
FIG. 8 is an enlarged cross-sectional view of the tiller apparatus of the present invention taken along lines 8—8 of FIG. 6.

The extension and retraction assembly 40 also includes a channel-shaped lever arm 64 rigidly attached to the trapeze carriage frame 42 between the upper and lower cross frame pieces 48, 50, as best seen in FIGS. 6 and 8. The lever arm 64 extends inwardly and upwardly from the trapeze carriage frame 42 to a position generally a spaced distance inwardly from upper mounting shaft 54.

As best shown in FIG. 8, the hydraulic cylinder 56 and ram 58 assembly is mounted inside the frame housing 34 for moving and controlling the trapeze carriage frame 42. The upper end of the cylinder 56 is pivotally mounted on a pin 60 attached to the upper end of the frame housing 34, and the lower end of piston rod or ram 58 is pivotally attached to the upper end of lever arm 64 by pin 62. Therefore, downward extension of piston rod or ram 58 causes the lower end of trapeze carriage frame 42 to swing outwardly in relation to the tractor T, and retraction of piston rod or ram 58 into the cylinder 56 causes the lower end of trapeze carriage frame 42 to swing inwardly toward the tractor T. Of course, since the lower end of trapeze carriage frame 42 is attached to the inward end of outrigger arm 14, extension and retraction of the piston rod 58 also causes the outrigger arm 14 and tiller head 16 to be retracted and extended respectively inwardly and outwardly in relation to the tractor T. The retracted position of the trapeze carriage frame, outrigger arm, and tiller head is shown in broken lines in FIG. 5.

Because of this novel structural arrangement of the extension and retraction assembly 40, particularly wherein the distance between upper mounting shaft 52 and pin 62 is significantly less than the distance between upper mounting shaft 52 and lower mounting shaft 54, the velocity and magnitude of movement of the outrigger arm 14 and tiller head 16 in the retraction and extension modes is significantly amplified over the travel of the piston rod or ram 58. Consequently, the retraction and extension operations of the tiller device of the present invention are more responsive and significantly enhanced in speed and magnitude of lateral movement over prior art in-row tiller apparatus.

As also best seen in FIGS. 6 and 8, the hydraulic cylinder 70 and ram 72 assembly is mounted between the extension and retraction assembly 40 and the outrigger arm 14 for applying vertical force components on outrigger arm 14 to lift the outrigger arm 14 and to control the soil penetration depth of the tiller head 16. The channel-shaped lever arm 64 has two spaced-apart parallel extensions 66, 68 protruding outwardly from between upper and lower cross frame pieces 48, 50 and outwardly from trapeze carriage frame 42. Each extension 66, 68, respectively, has a plurality of holes 67, 69 therein, with each hole 67 in extension 66 being in axial alignment with a corresponding hole 69 in extension 68. The upper end of cylinder 70 is mounted pivotally between extensions 66, 68 by pin 71 extending through selected corresponding ones of holes 67, 69. A pair of spaced-apart mounting ears 74 are rigidly attached to and extend upwardly from the top surface of outrigger arm 14, and the lower end of piston rod or ram 72 is pivotally attached to the ears 74 by pin 73. Therefore, retraction of ram 72 into cylinder 70 causes the outrigger arm 14 and tiller head 16 to be pivoted about lower mounting shaft 54 such that the distal end of outrigger arm 14 and tiller head 16 mounted thereon are lifted away from the ground, and extension of ram 72 outwardly from cylinder 70 causes the distal end of outrigger arm 14 to be lowered toward the ground and tiller head 16 to penetrate the soil for tilling operations.

It should be noted at this point that while the hydraulic cylinder 70 and ram 72 assembly is operable to lift and lower the tiller head 16 as desired by the operator, the ram 72 must also be able to float inwardly and outwardly of the cylinder 70 as the extension and retraction assembly 40 pivots inwardly and outwardly about upper mounting shaft 52; otherwise, movement of the lower end of trapeze carriage frame 42 outwardly would cause the tiller head 16 to be lifted out of the ground and inward pivotal movement of the lower end of trapeze carriage frame 42 would cause the tiller head 16 to be gouged into the ground. As will be described in more detail below, the hydraulic control system of the present invention not only accommodates these requirements, but also causes the hydraulic cylinder 70 and ram 72 assembly to effectively control the depth penetration of the tiller head 16 in the soil. This automatic control feature of cylinder 70 and ram 72 operates effectively both when the extension and retraction assembly 40 is operated to move the tiller head out of and into a row as well as when the mounting frame 12 moves in conjunction with the tractor T over uneven terrain in relation to the soil in the row to be tilled. Although this feature will be described in more detail below in conjunction with the description of the hydraulic control system, it should be noted here that the plurality of cylinder mounting holes 67, 69 in extensions 66, 68 of lever arm 64 accommodate selective variations in the angle 75, as shown in FIG. 8, between the cylinder 70 and ram 72 assembly and the outrigger arm 14. A variation in this angle 75 is effective to vary the vertical force components acting on the tiller head 16 for desired penetration of the tiller head 16 in the soil.

To complete the detailed description of the structural components of the preferred embodiment, reference is again made to FIGS. 5, 6, and 7. The rotary tiller head 16 is attached to and extends downwardly from the distal end of the outrigger arm 14 with its drive shaft 28 extending vertically downward below the outrigger arm 14. A flat circular rotor plate 22 is attached to the motor shaft 28 by an appropriate hub 24. The hydraulic motor 26 causes the rotor plate 22 to rotate when hydraulic fluid under pressure is supplied to the hydraulic motor 26, as will be described in more detail below with the description of the hydraulic control system. A plurality of elongated cultivator teeth 30 are attached to and extend downwardly from the periphery of the rotor plate 22 in spaced-apart relation to each other. The cultivator teeth 30 are adapted to penetrate and till the ground as the tiller head 16 is rotated by hydraulic motor 26.

A valve bank 18 comprised of three valves 110, 120, 130 for manually controlling the functions of the retractable tiller device is mounted on a support 19 above and to the rear of the mounting frame 12 in a position accessible to an operator seated on the tractor T. Manual operating handles 118, 128, 138 are connected respectively to valves 110, 120, 130 for the convenience of the operator. The structure and functions of the motor control valve 110, the lift cylinder control valve 120, and the extension and retraction cylinder control valve 130 will be described in more detail below in conjunction with the description of the hydraulic control system.

Figure 5:
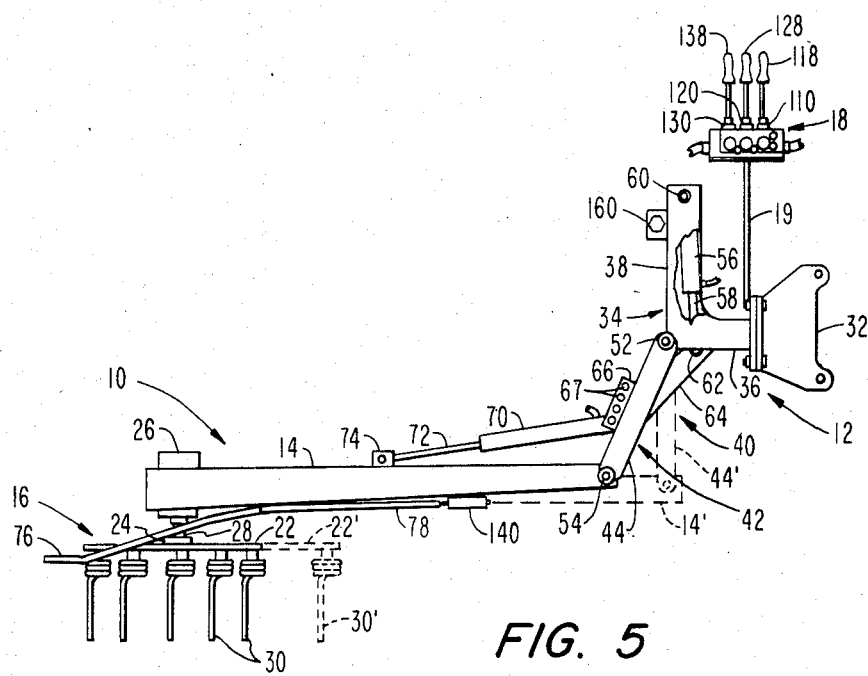
FIG. 5 is an enlarged front elevation view of the retractable in-row tiller apparatus of the present invention.
Figure 7:
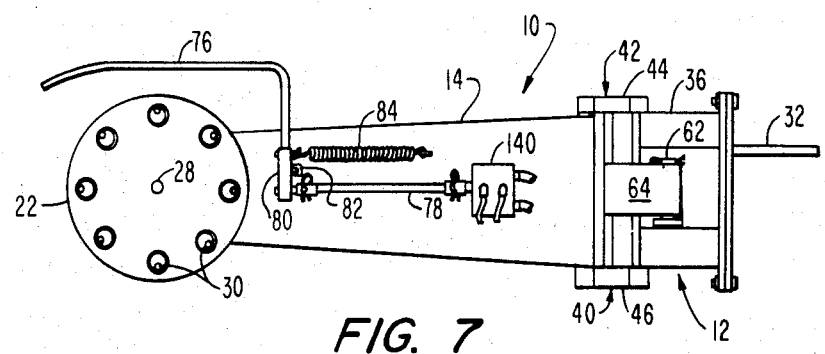
FIG. 7 is a bottom plan view of the retractable in-row tiller apparatus of the present invention.

As shown in FIGS. 5 and 7, automatic sensor and control apparatus for causing the tiller head 16 to be retracted from and extended into the row in response to detection of a plant or object in proximity to the tiller head 16 is provided. The automatic retraction control valve 140 is mounted on the bottom surface of the outrigger arm 14, and a feeler arm 76 adapted to contact plants or other objects in proximity to the tiller head 16 is connected to the actuator mechanism of automatic retractor control valve 140 by appropriate linkage. The linkage includes a sleeve 80 pivotally mounted on a pin 82 which is rigidly attached to the bottom surface of the outrigger arm 14, as shown in FIG. 7. One end of the feeler arm 76 is connected into one end of the sleeve 80, so that movement of the feeler arm 76 will cause the sleeve 80 to pivot about pin 82. A linkage rod 78 is connected at one end to the actuating mechanism of automatic retraction control valve 140 and at the other end to the sleeve 80. A tension spring 84 is connected between the outrigger arm 14 and the end of sleeve 80 to bias the sleeve 80 and feeler arm 76 to a normal position in which the automatic retraction control valve 140 is not actuated when feeler arm 76 is not in contact with a plant P or other object.

As the tiller head 16 is advanced in the row of plants P by the forward motion of the tractor T, the feeler arm 76 is adapted to contact a plant P just prior to the tiller head 16 reaching the plant P. A small increment of additional forward progress of the tiller apparatus results in the feeler arm 76 causing the sleeve 80 to pivot about pivot pin 82. This pivotal movement of sleeve 80 about pin 82 causes the linkage 78 to actuate the automatic retraction control valve 140 to cause the extension and retraction assembly 40 to retract the tiller head 16 from the row to allow it to pass around the plant P. This retracted position is shown in broken lines in FIG. 5 wherein the vertical frame section 44', outrigger arm 14', rotor plate 22', and tooth 30' correspond respectively to vertical frame section 44, outrigger arm 14, rotor plate 22, and tooth 30 in the normal extended position. When the tiller apparatus has advanced to the extent that the tiller head has passed around the plant P and the feeler arm 76 is no longer in contact with the plant P, the spring 84 will return the feeler arm 76 and automatic retraction valve 140 to their normal positions and the extension and retraction assembly 40 will cause the tiller head 16 to be extended back into the row to continue tilling the ground between the plants P.

Figure 9:
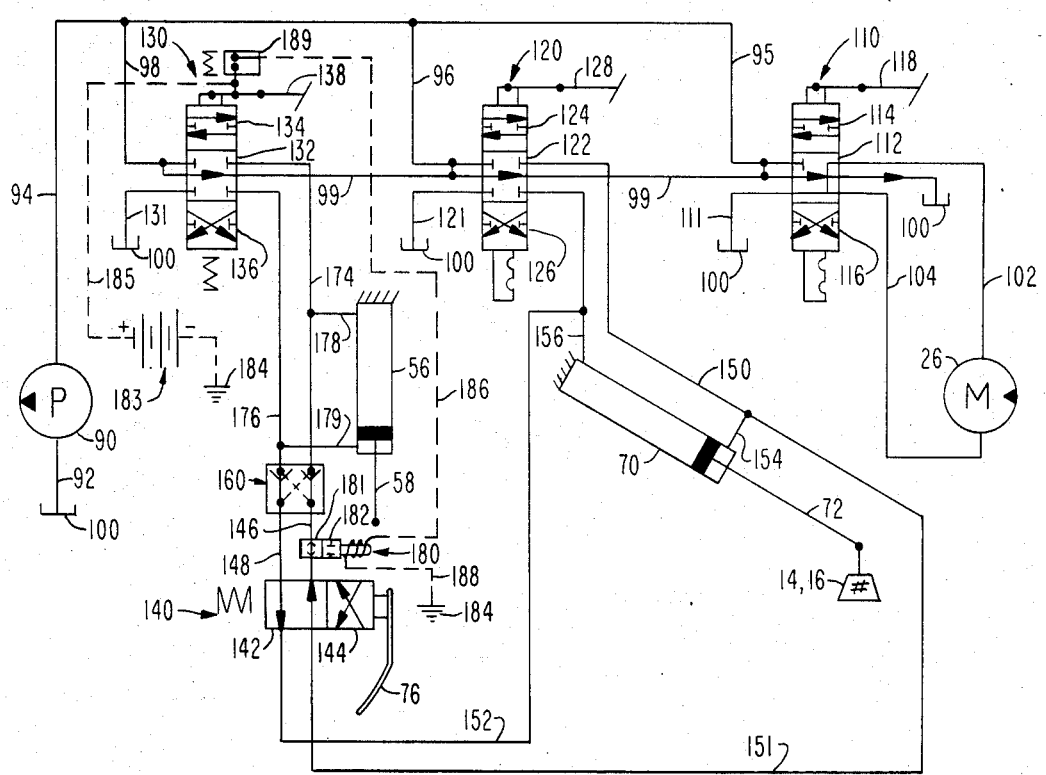
FIG. 9 is a schematic diagram of the hydraulic control system for the retractable in-row tiller device of the present invention.

The schematic diagram of the hydraulic control system for the retractable in-row tiller device of the present invention is shown in FIG. 9. A pump 90 draws hydraulic fluid from a tank 100 through suction line 92 to provide hydraulic fluid under pressure through the main pressure line 94 to the various components and branch lines of the hydraulic control system. Even though the tank 100 is shown in various locations throughout the schematic diagram in FIG. 9, as is conventional in such diagrams, it is understood to be a common tank or reservoir of hydraulic fluid.

A first branch pressure line 95 connected to main pressure line 94 provides a flow of hydraulic fluid under pressure to drive the hydraulic motor 26 that rotates the tiller head 16. A four-way valve 110, which is a part of the valve bank 18, is positioned in the first branch circuit 95 for manually controlling the flow of hydraulic fluid to the hydraulic motor 26. The valve 110 is comprised essentially of a spool with three control positions 112, 114, 116. The center spool position 112 is a neutral mode in which a hydraulic fluid under pressure in branch line 95 is not allowed to flow to the hydraulic motor 26. Therefore, when the valve 110 is in the neutral mode of spool position 112, the hydraulic motor 26 is not powered.

Spool position 114 is a straight flow through mode, so that when spool position 114 is shifted into alignment with branch pressure line 95 and return line 111, hydraulic fluid under pressure flows from branch pressure line 95 through spool position 114 and line 102 into the hydraulic motor 26 to power the motor in a forward direction. Return hydraulic fluid from the motor 26 flows through line 104 and through spool position 114 into return line 111 and back to tank 100 to complete the hydraulic fluid flow circuit.

Spool position 116 of valve 110 is a cross over mode. Therefore, when spool position 116 is shifted into alignment with branch line 95 and return line 111, hydraulic fluid under pressure flows from pressure line 95 into spool position 116 where it crosses over into line 104 to flow in a reverse direction into hydraulic motor 26 to cause the hydraulic motor 26 to rotate in a reverse direction. In this mode the hydraulic fluid is discharged from the motor 26 through line 102 and into spool position 116 where it is crossed over into the return line 111 to flow back to tank 100.

The valve 110 is provided with a handle 118 for manually shifting the spool to the desired mode for neutral, forward direction, or reverse direction of the hydraulic motor. Detent positions are preferably provided in valve 110 to hold the spool in the desired mode as the tiller apparatus is being operated. It should also be noted that center spool position 112 is preferably provided with a connection between lines 102 and 104, as shown in FIG. 9, so that the motor 26 can coast or rotate in float condition when the valve 110 is in neutral position.

A second branch pressure line 96 is provided to direct flow of hydraulic fluid primarily to the lift cylinder 70 and ram 72 assembly and secondarily to the retraction and extension cylinder 56 and ram 58 assembly through the automatic retraction control valve 140. A second four-way valve 120 is positioned in this second branch pressure line 96 and return line 121 to provide manual control of the hydraulic fluid to the lift cylinder 70. Second valve 120 has a spool comprised of three control mode positions 121, 124, and 126. Center spool position 122 is a neutral mode in which flow of hydraulic fluid through pressure branch line 96 and return line 121 is prohibited. Spool position 124 is shifted into alignment with branch pressure line 96 and return line 121, hydraulic fluid under pressure is allowed to flow from branch pressure line 96 straight through spool position 124 and through line 150 and 154 into the annular end of lift cylinder 70. Such flow of hydraulic fluid under pressure into the annular end of lift cylinder 70 causes the piston rod or ram 72 to retract into cylinder 70, thereby applying a vertically upward lift force component on outrigger arm 14 to act against the vertically downward force component on outrigger arm 14 resulting from the weight of the outrigger arm 14 and tiller head 16. As the piston rod 72 is retracted into cylinder 70, hydraulic fluid from the blind end of cylinder 70 flows out of the cylinder and through line 156 and spool position 124 into return line 121 to return to tank 100.

Spool position 126 of valve 120 is a cross-over mode. When spool position 126 is shifted into alignment with branch pressure line 96 and return line 121, hydraulic fluid under pressure is allowed to flow from branch pressure line 96 into spool position 126 where it is crossed over to line 156. In this mode, hydraulic fluid under pressure is directed by line 156 into the blind end of lift cylinder 70 causing the piston rod 72 to be extended, thereby applying a vertically downward force component to the outrigger arm 14. As the piston rod 72 is extended outwardly from cylinder 70, hydraulic fluid in the annular end of cylinder 70 is discharged into line 154 and allowed to flow through line 150 into spool position 126 where it is crossed over into return line 121 to flow back to tank 100.

A handle 128 is provided on valve 120 for manual operation thereof, and detent features are also provided to maintain the spool of valve 120 in any of the desired modes provided by positions 122, 124, or 126.

This novel arrangement for the first and second branch circuits not only provides motor and lift control, as described above, but it also provides a novel depth control feature for the tiller. When valve 110 in the first branch circuit is in a position to allow flow of hydraulic fluid through motor 26, the pressure in the main pressure line 94 is dropped to a pressure level just necessary to maintain rotation of the hydraulic motor 26, which is determined by the load required to rotate the tiller head 16. As the load required to rotate the tiller head increases, for example, from increased penetration in the ground or from encountering increased resistance to rotation by a harder ground or the like, the pressure in main pressure line 94 will be increased correspondingly. Likewise, when the power required to rotate the tiller head 16 is decreased, there will be a corresponding decrease in pressure in the main pressure line 94. Under these conditions with the first branch circuit in a mode to power the hydraulic motor 26, when the valve 120 is positioned in a flow through mode, for example, in the straight flow through mode of spool position 124 for forward rotation, the hydraulic pressure in the second branch, i.e., the pressure applied to the lift cylinder 70 and ram 72 assembly, will be approximately equal to the pressure in main pressure line 94 and first branch pressure line 95. This pressure is essentially the pressure required to drive hydraulic motor 26 to rotate tiller head 16. Consequently, if additional pressure is required to rotate tiller head 16, the pressure in main pressure line 14, as well as the pressure to branch pressure line 96 directed into the lift cylinder 70, is correspondingly increased. Likewise, if the power requirements to rotate tiller head 16 is decreased, the pressure in main pressure line 94, as well as in branch pressure line 96 directed to lift cylinder 70, is also decreased. Therefore, when valve 120 is in the straight flow through mode of spool position 124, the vertical force component applied by ram 72 to outrigger arm 14 and tiller head 16 varies in direct proportion to the pressure necessary to rotate the tiller head 16.

The tiller device of the present invention is designed generally such that there is sufficient weight in the combination of the outrigger arm 14 and tiller head 16 to cause the cultivator teeth 30 to penetrate the ground to be tilled. However, control is necessary to insure that the cultivator teeth do not penetrate excessively or gouge into the soil. It is also undesireable to allow the cultivator teeth to be lifted out of the soil due to the tractor moving over uneven terrain or due to the pivotal movement of the extension and retraction assembly 40 in the geometry of its connection to outrigger arm 14 as described above. Therefore, the size of the hydraulic motor 26 and the size and position of the lift cylinder 70 are preferably arranged such that an optimum balance is reached wherein the hydraulic pressure required to rotate tiller head 16 with the cultivator teeth 30 at a desired depth is approximately equal to the hydraulic pressure required to be applied to the piston in lift cylinder 70 to result in a sufficient vertically upward force component by ram 72 on outrigger arm 14 to maintain the cultivator teeth 30 on the tiller head 16 at that desired depth. Referring back to FIGS. 5, 6, and 8, the plurality of cylinder mounting holes 67, 69 in extensions 66, 68, respectively, for mounting cylinder 70 at various angles to outrigger arm 14 provide the necessary adjustment variable to achieve the optimum hydraulic pressure conditions described above for maintaining the cultivator teeth 30 at approximately the desired penetration depth.

When the lift cylinder 70 is mounted in the appropriate position in extensions 66, 68, as described above, to provide the optimum angle for the depth of penetration by the cultivator teeth desired by the operator, the hydraulic operating system will function to maintain a reasonable approximation of that depth and prevent gouging or lifting out of the soil. For example, if the tractor tilts in a direction that would tend to gouge the cultivator teeth deeper into the ground, the pressure required to continue rotating the tiller head 16 would increase almost instantaneously. With valve 120 in the straight flow through mode of spool position 124, the pressure applied through line 154 into the annular end of lift cylinder 70 would likewise be increased simultaneously to provide an increased lifting force vector on outrigger arm 14. This increased lifting force vector pulls the tiller head and cultivator teeth 30 upwardly to a more shallow depth where the optimum pressure balance required by motor 26 to rotate the tiller head 16 as well as by lift cylinder 70 to maintain the optimum depth is again reached.

Similarly, if the tractor T tips the opposite direction, which would tend to lift the tiller head 16 and cultivator teeth 30 out of the ground, the pressure required to power hydraulic motor 26 to rotate the tiller head 16 would be decreased, thereby causing a simultaneous corresponding decrease in hydraulic pressure in main pressure line 94 and a corresponding decrease in hydraulic pressure applied to the annular end of lift cylinder 70 to result in a decrease in the vertical lift force component applied by ram 72 on outrigger arm 14. Therefore, the weight of the outrigger arm 14 and tiller head 16 would be allowed to pull the tiller head 16 downwardly to cause the cultivator teeth 30 to penetrate deeper into the ground to the desired optimum depth where a balance in hydraulic pressure required to drive hydraulic motor 26 and to maintain the desired vertical force component on outrigger arm 14 by ram 72 is reached.

In a like manner, the same pressure balancing and operational functions of the integrated hydraulic motor circuit and lift cylinder circuit accommodate angle changes between the trapeze carriage frame 42 and outrigger arm 14 during extension and retraction of the outrigger arm 14 and tiller head 16 into and out of a row by the extension and retraction assembly 40, as required by the geometry of the apparatus described above. This accommodation of angle changes during retraction and extension motion is accomplished while still maintaining the desired penetration depth of the cultivator teeth 30 through out such retraction and extension operations.

A third branch pressure line 98 is provided for a primary supply of hydraulic fluid under pressure to the extension and retraction cylinder 56 and ram 58 assembly. This third branch pressure line 98 and return line 131 is integrally connected with lines 150 and 156 of the second branch circuit as a secondary source of hydraulic fluid under pressure for the automatic operation of the extension and retraction cylinder 56 and ram 58.

For clarity, the automatic control of the extension and retraction cylinder 56 and ram 58 assembly will be described first. This description will be followed by a description of the manual control for the extension and retraction assembly by use of valve 130 to follow. When valve 120 is positioned in the straight flow through mode of spool position 124, hydraulic fluid under pressure from the main pressure line 94 is allowed to flow through branch pressure line 96 into line 150; therefore, the flow of hydraulic fluid under pressure in line 150 is also supplied to line 151 where it is directed to automatic retraction control valve 140.

The automatic retraction control valve 140 has a spool comprised of two mode positions 142, 144. The valve 140 is spring biased to maintain spool position 142, which is a straight flow through configuration, in alignment with line 151 and return line 152. In normal operation, valve 130 is in the neutral mode of spool position 132 wherein flow of hydraulic fluid through valve 130 is prohibited, and spool position 142 of automatic retraction control valve 140 is in a straight flow through condition. Hydraulic fluid under pressure in line 151 is allowed to flow through valve 142 and through solenoid valve 180 and lock valve 160 in line 146 to the blind end of hydraulic cylinder 56 via line 178. The functions of the solenoid valve 180 and lock valve 160 will be described below. Suffice it to say at this point that in the normal operating condition just described, both the solenoid valve 180 and lock valve 160 are open to allow straight flow through of hydraulic fluid from line 151 to the blind end of cylinder 56. Therefore, with the hydraulic fluid under pressure from line 151 directed through lines 146 and 178 to the blind end of cylinder 56, the ram 58 is forced to and maintained in the extended position.

Reference back to FIG. 8 shows that when the ram 58 is in extended condition, the outrigger arm 14 is also in extended position in relation to the tractor. In this extended position, under normal circumstances, the tiller head 16 is positioned to till the soil between the plants P in a row as shown in FIG. 1.

When the tiller head 16 approaches a plant P or other object in the row, the feeler arm 76 contacts the object and through the linkage described above causes the mode of automatic retraction control valve 140 to be shifted so that the cross-over mode of spool position 144 is in alignment with lines 151 and 152. Therefore, the hydraulic fluid under pressure in line 151 is crossed over in spool position 144 to flow into line 148, through lock valve 160, and through line 179 into the annular end of cylinder 56. The hydraulic fluid pressure in the annular end of cylinder 56 causes the ram 58 to be retracted into the cylinder 56, and the hydraulic fluid discharged from the blind end of cylinder 56 flows through line 178, 146 and into spool position 144 of valve 140 where it is crossed over into line 152 to return to tank 100 via lines 156, spool position 124 of valve 120 and return line 121.

Again, in referring back to FIGS. 5 and 8, retraction of the ram 58 into cylinder 56 causes retraction of outrigger arm 14 and tiller head 16 toward the tractor, as shown in broken lines in FIG. 5. In this retracted position, the tiller head 16 is allowed to pass around plant P without harming it, as shown in FIG. 4. As soon as the tiller head 16 has passed around the plant and the feeler arm 76 is no longer in contact with the plant, the spring biased automatic retraction control valve 140 shifts back into the normal mode with straight flow through spool position 142 again aligned with lines 151, 152. Again, in this configuration, the hydraulic fluid pressure in line 151 is directed straight through spool position 142 of valve 140 and through lines 146, 178 into the blind end of cylinder 56 to again force the ram 58 to extend outwardly to extend the tiller head 16 back into the row between the plants P. As this extension occurs, the hydraulic fluid discharged from the annular end of cylinder 56 flows through lines 179, 148 and straight through spool position 142 into line 152 to return to tank 100 via lines 156, spool position 124 of valve 120 and return line 121.

As mentioned above, four-way valve 130 is positioned in the third branch pressure line 198 to provide manual control of the retraction and extension cylinder 56 and ram 58 assembly if desired by the operator. Valve 130 has a spool comprised of three mode positions 132, 134, and 136. The middle spool position 132 is a neutral mode wherein the flow of hydraulic fluid under pressure in branch pressure line 98 is prevented from flowing through valve 130. Spool position 134 is of a straight flow through mode, and spool position 136 is of a crossover flow mode. Lever 138 is provided to accommodate selective manual movement of the spool to positions 132, 134, 136 as desired into alignment with branch pressure line 98 and return line 131. Valve 130 is preferably spring biased to return to the neutral mode of spool position 132 whenever the lever 138 is released by the operator.

There are situations in which it may be desirable for the operator to manually cause the extension and retraction assembly 40 to retract the tiller head 16 from the row even though the automatic retraction control valve 140 is not actuated. For example, when the plants in the row being tilled are too small to effectively push the feeler arm 76 to actuate the automatic retraction control valve 140, the operator should have the option to manually cause the extension and retraction assembly 40 to retract the tiller head 16 out of the row to avoid the small plant.

There are also situations in which the operator might desire to override the automatic retraction control valve 140 to maintain the tiller head 16 in the row, even though a plant is effectively pushing against the feeler arm 76 with sufficient force to actuate the automatic retraction control valve 140. For example, if the row of plants being tilled has been allowed to grow into weeds of substantial size that would be strong enough to push the feeler arm 76 to actuate the automatic retraction control valve 140, the extension and retraction assembly 40 would be activated to retract the tiller head 16 from the row, thereby passing around the large weeds which the operator might desire to till out of the ground. The operator should have the option to override the automatic retraction mode in conditions such as these to prevent the retraction of the tiller head 16.

The valve 130 provides the operator with these manual control options. When the valve 130 is shifted manually by handle 138 so that the spool position 136 is placed in alignment with the branch pressure line 98 hydraulic fluid under pressure from branch pressure line 98 is allowed to flow into spool position 136 where it is crossed over into line 176. In this mode, the lock valve 160 is to prevent the flow of hydraulic fluid in line 148 toward the automatic retraction control valve 140. Therefore, the flow of hydraulic pressure in line 176 is diverted through line 179 into the annular end of cylinder 56, thereby causing the ram 58 to be retracted into cylinder 56. As the ram 58 is retracted into cylinder 56, the hydraulic fluid in the blind end of the cylinder 56 is discharged through line 178 into line 174 where it proceeds to spool position 136 and is crossed over into return line 131 to return to tank 100.

Therefore, in this mode as the ram 58 is retracted into cylinder 56, the extension and retraction assembly 40 retracts the tiller head 16 out of the row. Then, when the lever 138 is released, the valve 130 is spring biased to return to the neutral mode of spool position 132, which prohibits flow of hydraulic fluid through valve 130. Since pressure flow through valve 130 is shut off, the pressurized hydraulic fluid in line 151 can flow again through spool 142 of automatic retraction control valve 140 and through line 146 to cause the lock valve 160 to be opened again. When the lock valve 160 is opened, it allows the continued flow of hydraulic fluid under pressure from line 151 into the blind end of cylinder 56 via line 146 and line 178 to cause the ram 58 to be extended out of the cylinder 56, thereby causing the extension and retraction assembly 40 to extend the tiller head 16 back into the row. As the ram 58 is extended outwardly from the cylinder 56, the hydraulic fluid in the annular end of cylinder 56 is discharged outwardly through line 179 into line 176 where it flows through lock valve 160 and line 148 and through spool 142 to line 152. From line 152, the discharged hydraulic fluid flows back to tank 100 via line 156, spool 124 of valve 120, and return line 121.

Figure 10:
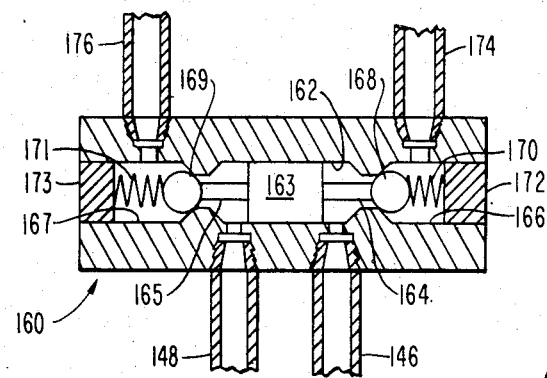
FIG. 10 is an enlarged sectional view of the lock valve utilized in the hydraulic control system of the present invention.

As just described above, the lock valve 160 functions to prevent the flow of hydraulic fluid from lines 174, 176 into lines 146, 148 when the valve 130 is in the cross-over mode of spool position 136 to retract ram 58 into cylinder 56, but it is automatically opened to allow fluid flow between lines 146 and 174 and lines 148 and 176 when the valve 130 is returned to the neutral mode of spool position 132. The conventional lock valve 160, as shown in more detail in FIG. 10, is a double pilot operated check valve such as the 409 series lock valves manufactured by Metro Hydraulics, Inc., in Minneapolis, Minn. It is comprised of a valve body 161 having a transverse internal cylinder bore 162 with a piston 163 slidably positioned therein. A pilot rod 164 extends outwardly from the right side of piston 163 toward a right valve chamber 166. Another pilot rod extends outwardly from the left side of piston 163 toward a left valve chamber 167.

A right ball check 168 is positioned in right valve chamber 166 and is normally seated by a bias spring 170 to prevent fluid flow between the right valve chamber and the internal cylinder bore 162. Likewise, a left ball check 169 is positioned in left valve chamber 167 and is normally seated by bias spring 171 to prevent fluid flow between left valve chamber 167 and internal cylinder bore 162. The right spring 170 is held in position by a plug 172 in valve body 161, and left spring 171 is retained in position by plug 173 in the left side of valve body 161. Line 146 is directed into the internal cylinder bore to the right side of piston 163, and line 148 is directed into the internal cylinder bore to the left side of piston 163. Line 174 is connected in fluid flow relation into right valve chamber 166, and line 176 is connected in fluid flow relation into left valve chamber 167.

If hydraulic fluid under pressure is directed from line 146 into internal cylinder bore 162, the resulting hydraulic fluid pressure in the internal cylinder bore to the right of piston 163 causes right ball check 168 to be unseated, thereby allowing fluid flow from internal cylinder bore 162 through valve chamber 166 and out line 174. Also, the hydraulic fluid pressure in the internal cylinder bore 162 to the right of piston 163 causes piston 163 to slide leftward. As the piston 163 slides leftward the left pilot rod 165 physically pushes ball check 169 off its seat to allow return hydraulic fluid flowing in line 176 to flow through left valve chamber 167, into internal cylinder bore 162 to the left side of piston 163 and out line 148. Likewise, hydraulic fluid under pressure in line 148 causes an increase in fluid pressure in internal cylinder bore 162 to the left of piston 163, which causes left ball check 169 to be unseated, thereby allowing the hydraulic fluid to flow under pressure from internal cylinder bore 162 through left valve chamber 167 and out line 176. The increased hydraulic pressure in internal cylinder bore 162 to the left side of piston 163 also causes piston 163 to slide rightward so that the right pilot rod 164 physically pushes right ball check 168 off its seat, thereby allowing return fluid in 174 to flow through right valve chamber 166 and through internal cylinder bore 162 to the right of piston 163 and out line 146. However, hydraulic fluid pressure in either line 174 or line 176 when there is less pressure in lines 146, 148 would cause the ball checks 168, 169 to seat and prohibit any reverse flow through the lock valve 160 under such circumstances.

However, a problem situation is caused when crossover spool 136 of valve 130 directs hydraulic fluid under pressure from branch pressure line 98 into line 176 while an equal pressure from line 151 is directed through line 146 into the lock valve 160. The fluid pressure in line 176 tends to seat left ball check 169 to prevent fluid flow thereto, while the fluid pressure in line 146 directed into cylinder bore 162 causes the piston 163 to move leftward such that the left pilot rod 165 physically holds left ball check 169 in the unseated position. The fluid pressure in cylinder bore 162 also unseats right ball check 168. Therefore, if this condition was allowed to exist, hydraulic fluid under pressure from line 151 would be shunted directly to tank via line 174 into spool position 136 to return to tank 100. At the same time, the hydraulic fluid under pressure from branch pressure line 98 would also be shunted directly to tank by crossing over in spool 136 to line 176 and through lines 148, 152, and 156 and through spool position 124 of valve 120 into return line 121 to return to tank 100. Therefore, with the hydraulic fluid pressure line shunted to tank through two routes, the hydraulic fluid pressure in the main pressure line 94 would diminish to the extent that it would not be effective to operate the system.

A solenoid valve 180 is positioned in line 146 between automatic retraction control valve 140 and lock valve 160 to prevent this problem. The solenoid valve 180 is comprised of two spool modes 181, 182. Mode 181 allows direct flow of hydraulic fluid through the solenoid valve, and mode 182 prohibits flow of fluid in line 146 through the solenoid valve 180. The solenoid valve 180 is electrically powered preferably by the battery 183 of the electrical system of the tractor T or some other convenient source of electrical power. A normally open contact switch 189 is mounted on the lever 138 of valve 130, as shown in FIG. 9 to actuate the solenoid valve 180. The battery is connected to ground 184, and the solenoid valve 180 is connected to ground 184 by wire 188. A wire lead 185 also extends from the battery to switch 189, and another electrical lead 186 extends from the switch 189 to the solenoid valve 180.

When the lever 138 of valve 130 is manually moved to place valve 130 in the cross-over mode of spool position 136 to cause the ram 58 to be retracted into cylinder 56 to retract the tiller head 16 out of the row, contact is simultaneously made in switch 189 to complete the electrical circuit. The closed electric circuit causes solenoid valve 180 to shift to the closed mode of spool position 182, thereby cutting off the hydraulic fluid pressure from line 151 through 146 to the lock valve 160. Therefore, since the hydraulic fluid pressure in line 151 cannot reach internal cylinder bore 162 through line 146, both the left and right ball checks 168, 169 will remain seated to prevent flow of hydraulic fluid from either line 174 or line 176 through the lock valve 160. In this manner, the hydraulic circuit connected to cylinder 156 is isolated to the circuit of branch pressure line 98 and return line 131 and lines 174, 176, 178, and 179, to avoid the problem described above of direct shunting of the pressurized hydraulic fluid to tank. Consequently, when the valve 130 is shifted to the cross-over mode of spool position 136, the hydraulic system pressure is effective to retract ram 58 into cylinder 56 to retract the tiller head 16 out of the row. When the lever 138 is released however, valve 130 automatically shifts back to the neutral mode of spool position 132, and switch 189 is opened simultaneously to break the electrical circuit to solenoid valve 180. Therefore, the solenoid valve 180 also switches simultaneously back to the straight flow through mode of spool position 181 so that the hydraulic fluid under pressure in line 151 is again allowed to flow through line 146 and lock valve 160 to the blind end of cylinder 56 via lines 174, 178 to extend the ram 58 out of the cylinder 56, thereby to extend tiller head 16 back into the row.

When the operator desires to maintain tiller head 16 in the row even though feeler arm 76 has contacted a large object or weed sufficient to actuate automatic retractor control valve 140, he can manually move lever 138 of valve 130 to shift valve 130 to the straight flow through mode of spool position 134. In this mode, the operator can override the retraction cycle that would otherwise be caused by actuation of the automatic retraction control valve 140 to the cross-over mode of spool position 144. As described hereinbefore, when a sufficiently large object such as a plant or large weed is contacted by the feeler arm 76, the automatic retraction control valve 140 is shifted to the cross-over mode of spool position 144, thereby directing the hydraulic fluid under pressure in line 151 over to line 148 where it flows through lock valve 160, line 176, and through line 179 into the annular end of cylinder 56 to cause retraction. However, when valve 130 is also shifted to the straight flow through mode of spool position 134, the hydraulic fluid under pressure in branch pressure line 98 is allowed to flow through spool position 134 and into line 174 and causes the right ball check 168 of the lock valve to seat thereby directing the pressurized fluid flow from line 98 through line 174 and line 178 into the blind end of cylinder 56 to maintain ram 58 in the extended position in spite of the attempt of automatic retraction control valve 140 to cause retraction.

It is noted that the four-way valves 110, 120, 130 in valve bank 118 are connected together in the conventional manner wherein hydraulic fluid is allowed to circulate to tank 100 via an internal bypass route 99 when all of the valves are in their respective neutral modes. However, when any of these valves 110, 120, 130 is shifted out of the neutral mode, this circulation to tank 100 through bypass 99 is foreclosed.

To summarize the operation of the retractable tiller apparatus 10 of the present invention, start up of the system is usually begun with all three valves 110, 120, 130 of valve bank 18 in their respective neutral positions. When all the valves are in their respective neutral positions, the outrigger arm 14 is normally down with the tiller head 16 resting on the ground, the hydraulic motor 26 is still, and the outrigger arm 14 is in the extended position in relation to the tractor T. The first step therefore, is to energize the hydraulic pump 90, which is preferably driven by the engine of the tractor T. The next step is to manually move lever 128 of valve 120 to shift valve 120 to the straight flow through mode of spool position 124. This mode allows pressurized hydraulic fluid from branch pressure line 96 to flow through line 150 and line 154 into the annular end of cylinder 70 to retract ram 72 into cylinder 70 and lift the outrigger arm 14 and tiller head 16 off the ground to the position shown in FIG. 3. Valve 120 can then be shifted back to the neutral mode 122, and the outrigger arm 14 will remain in this raised position. In this raised position, the tractor and tiller apparatus can be driven to the location where in-row tilling of plants is desired. It is noted here that retraction and extension cylinder 56 is preferably larger in diameter than lift cylinder 70. Consequently, in the event the outrigger arm 14 is in the retracted position when the valve 120 is shifted to mode 124, cylinder 56 will extend the outrigger arm 14 before cylinder 70 lifts the outrigger arm 14.

When the operator is ready to start the tilling operation, lever 118 of valve 110 is moved manually to shift valve 110 to the straight flow through mode of spool position 114. This mode 114 allows the hydraulic fluid to flow from branch pressure line 95 through line 102 to activate the motor 26 while the outrigger arm 14 is still in raised position. The next step then is to manually move lever 128 of valve 120 to shift valve 120 to the straight flow through mode of spool position 124, which exposes the cylinder 70 to the same pressure that exists in main pressure line 94 and branch pressure line 95. This pressure, as described above, is insufficient for the ram 72 to hold up the weight of outrigger arm 14 and tiller head 16, particularly when the hydraulic motor 26 is merely rotating tiller head 16 in the air. Therefore, outrigger arm 14 and tiller head 16 slowly settle toward the ground to the positions shown in FIGS. 1, 2, and 4. Then, as the weight of the outrigger arm 14 and tiller head 16 cause the rotating cultivator teeth 30 to penetrate into the ground, additional pressure is required by the hydraulic motor 26 to rotate the tiller head 16. This increased hydraulic pressure in the system simultaneously causes an increased vertical lift component to be applied by ram 72 on outrigger arm 14 to maintain the tiller head 16 and cultivator teeth 30 at an optimum desired penetration depth in the ground for the desired tilling effect.

The normal operation of the tiller apparatus 10 of the present invention, therefore, is with the valve 110 in the straight flow through mode of spool position 114, the valve 120 in the straight flow through mode of spool position 124, and the valve 130 in the neutral mode of spool position 132. During such normal operation, the tiller will be retracted automatically from the row whenever the feeler arm 76 contacts the plant or object of sufficient size or resistance to actuate the automatic retraction control valve 40, and the tiller head 16 will be extended back into the row when it has passed around the plant and the feeler arm 76 is no longer in contact with the plant, all as described above. Also as described above, the operator can manually cause the tiller head 16 to be retracted out of the row by moving lever 138 of valve 130 to shift valve 130 to the cross-over mode of spool position 136. He can also override the automatic retraction feature to hold the tiller head 16 in the row even when the feeler arm 76 has contacted a substantial object by moving lever 138 of valve 130 to shift valve 130 to the straight flow through mode of spool position 134.

The unique hydraulic operating system of the present invention also includes another operating feature that has been beneficial in cleaning the tiller head 16 when the tiller teeth 30 become wrapped in long weeds. The tiller head 16 can usually be cleaned effectively and freed of such weeds by momentarily moving the lever 118 of valve 110 to shift valve 110 from the straight flow through mode of spool position 114 to the neutral mode of spool position 112. This momentary shifting of modes of valve 110 to the neutral mode of spool position 112 instantaneously stops the flow of fluid from branch pressure line 95 to the hydraulic motor 26, thereby causing an immediate and substantial increase in the hydraulic pressure in main pressure line 94 as well as in branch pressure line 96 and line 150. This substantially increased pressure is directed to the annular end of cylinder 70 through line 154, which causes an immediate and substantial increase in the vertical lift force component applied by ram 72 to the outrigger arm 14. This substantial increase in the vertical lift component dramatically pulls the outrigger arm 14 and tiller head 16 upwardly from the ground in a jerking motion. As the valve 110 is then shifted back to the straight flow through mode of spool position 114, the hydraulic motor 26 is instantaneously and dramatically restored to motion to rotate the tiller head 16 as it is above the ground, which causes the weeds to be flung outwardly and away from the tiller teeth 30. Of course the resumption of motion by the motor 26 with the tiller head 16 in the air again causes a drop in hydraulic pressure in main pressure line 94 and branch pressure line 96 and line 150, causing a simultaneous reduction of hydraulic fluid pressure in the annular end of cylinder 70, thereby reducing the vertical lift force component applied to outrigger arm 14 by ram 72 and allowing the tiller head 16 to settle to the ground again to resume normal tilling operations.

DETAILED DESCRIPTION OF THE FIRST ALTERNATIVE EMBODIMENT

Figure 9A:
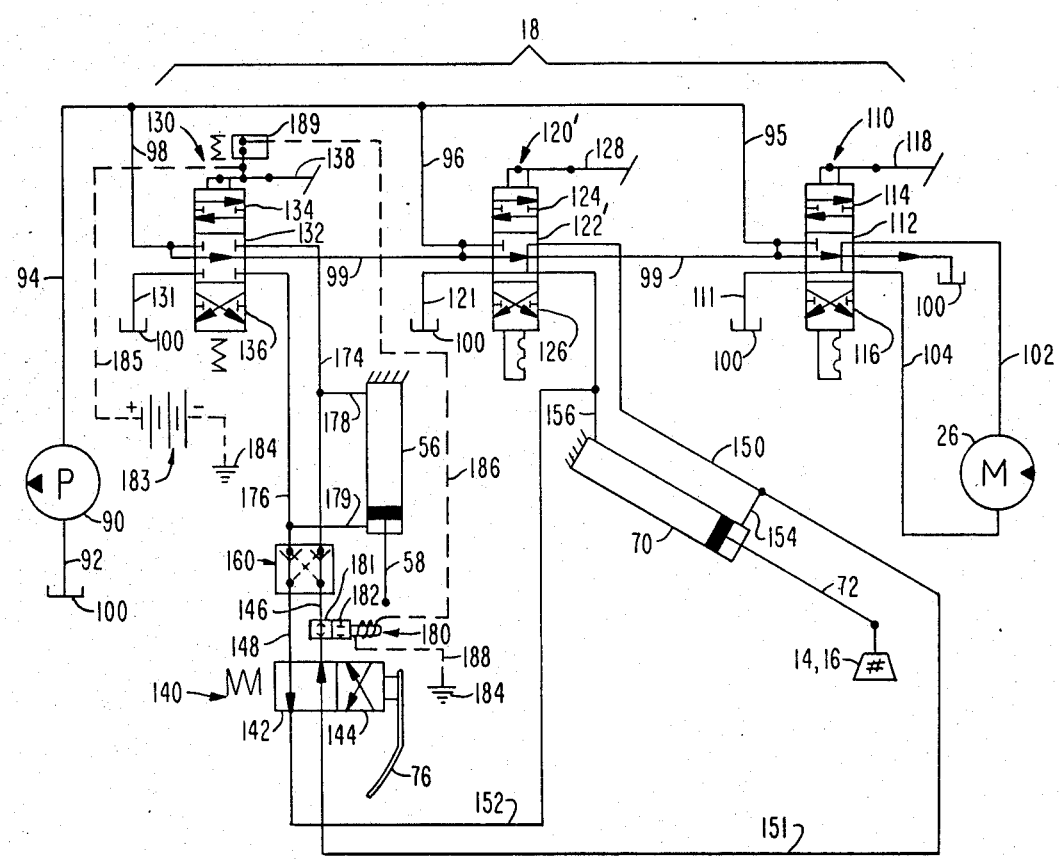
FIG. 9A is a schematic diagram of an alternate embodiment of the hydraulic control system for the retractable in-row tiller device of the present invention showing an alternate valve.

In an alternative embodiment as shown in FIG. 9A, a second valve 120' can have a neutral spool position 122' provided with a connection between line 150 and line 156 to allow the ram 72 in cylinder 70 to merely float as dictated by the weight forces of the outrigger arm 14 and tiller head 16 with no vertical force components applied in either an upward or downward direction by the hydraulic cylinder 70 and ram 72 assembly. This float mode might be appropriate in some soil conditions; however it does not provide the same degree of control as the depth control feature of the hydraulic system described above.

DETAILED DESCRIPTION OF THE SECOND ALTERNATIVE EMBODIMENT

Figure 11:
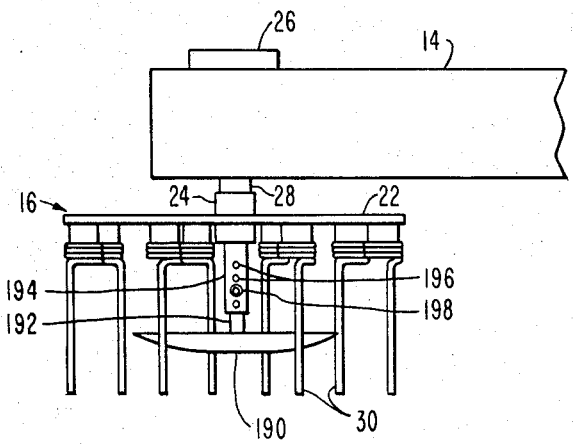
FIG. 11 is a front elevation view of the tiller head equipped with a positive depth control plate according to the present invention.

In another alternative embodiment, a positive depth control plate 190, as shown in FIG. 11, can be attached in the tiller head 16 under the rotor plate 22 and between the teeth 30. The positive depth control plate 190 is preferably dish-shaped with a convex bottom surface adapted to ride on the ground with a minimum of gouging or resistance, and it is set a fixed distance upwardly from the lower ends of the teeth. Therefore, when the teeth have penetrated into the ground a sufficient distance to where the positive depth control plate 90 contacts the surface of the ground, the positive depth control plate 90 will prevent additional penetration of the teeth into the ground. An axial shaft 190 is rigidly attached to and extends upwardly from positive depth control plate 90 and into a sleeve 194, which is an extension of the drive shaft 28 of the hydraulic motor 26. It is attached in fixed position to the sleeve 194 by a pin 198, and the sleeve 194 is provided with a plurality of holes 196 to accommodate adjustably setting the positive depth control plate 190 at various vertical positions in relation to the teeth 130 to allow penetration to a variety of desired depths.

DETAILED DESCRIPTION OF THE THIRD ALTERNATIVE EMBODIMENT

In another alternative embodiment, an elongated tiller head 200 is provided to till a wider path. This tiller head 200 is comprised of a horizontal frame 202 pivotally attached to the distal end of outrigger arm 14 by brackets 204 mounted on pin 206. The horizontal frame is maintained in alignment with outrigger arm 14 by a pair of spaced-apart vertical guide bars 208, 209 attached to and extending upwardly from the inside end of the horizontal frame 202, which are adapted to slidably contact the opposite edges of outrigger arm 14. A hydraulic motor 210 is mounted on the outer end of horizontal frame 212 with its drive shaft 212 extending vertically downward, and a drive sprocket 214 is mounted on the drive shaft 212 of the motor 210. An idler shaft 218 journaled in a bearing 219 extends downwardly from the inside end of horizontal frame 212, and an idler sprocket 216 and a plurality of tiller teeth 222 are attached to and extend downwardly from the chain 220 in spaced-apart relation to each other.

Figure 12:
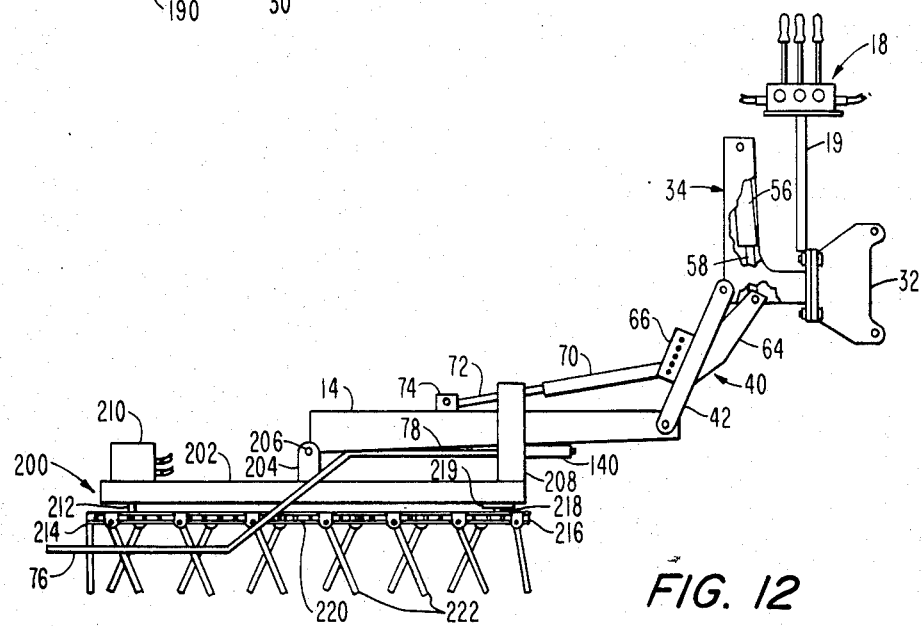
FIG. 12 is a front elevation view of the first alternative embodiment of an elongated tiller head with a plurality of tiller teeth attached to and depending downwardly from a single continuous chain in a horizontal plane.
Figure 13:
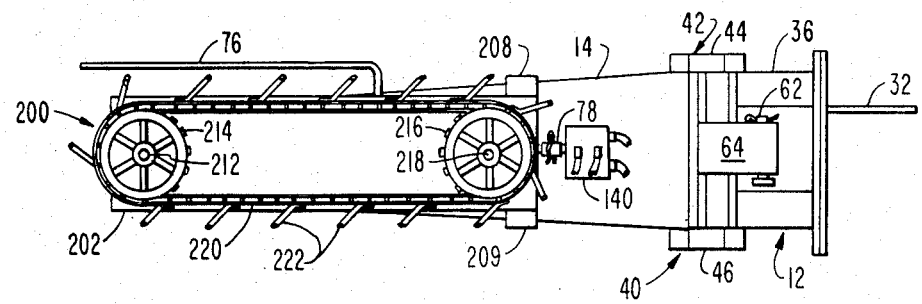
FIG. 13 is a bottom plan view of the alternative embodiment of the tiller shown in FIG. 12.

As the hydraulic motor 212 turns the drive 214, the chain 220 is driven to move the tiller teeth 222. As the tiller apparatus progresses in a forward motion, the front segment of the chain 220 moves the teeth 222 through the ground in one direction transverse to the forward motion of the tiller resulting in some movement of the soil in the same transverse direction, and the rear section or segment of the chain moves the tiller teeth in the opposite transverse direction to the forward motion to till the same ground again and cause some slight movement of the ground in the opposite direction back to approximately its original location. In this manner, the tilled ground is left approximately level with insignificant net movement of the soil in either transverse direction. The remaining components of the alternative embodiment shown in FIGS. 12 and 13 are essentially the same as those described in the preferred embodiment above.

DETAILED DESCRIPTION OF THE FOURTH ALTERNATIVE EMBODIMENT

Figure 14:
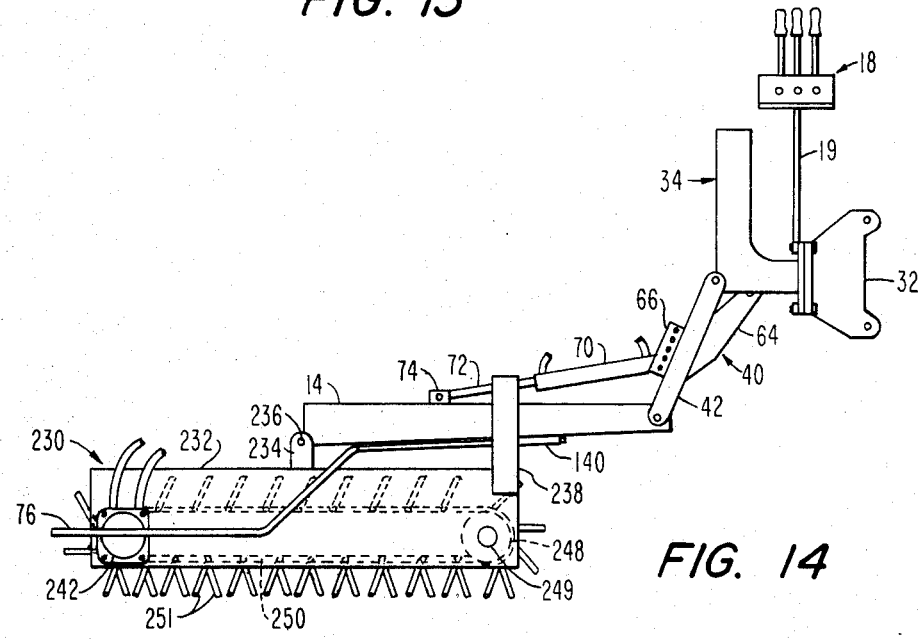
FIG. 14 is a front elevation view of the second alternative embodiment of the retractable tiller apparatus of the present invention equipped with an elongated tiller head having two continuous chains in spaced-apart vertical planes, each having a plurality of tiller teeth attached to and depending downwardly therefrom.
Figure 15:
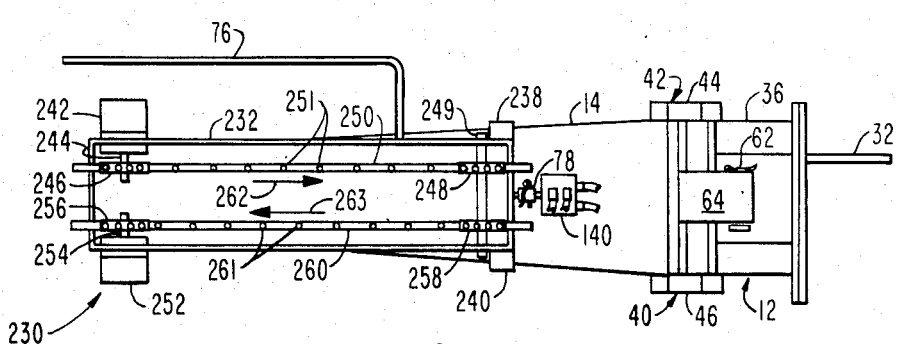
FIG. 15 is a bottom plan view of the retractable tiller apparatus of the alternative embodiment shown in FIG. 14.

Still another alternate embodiment is shown in FIGS. 14 and 15. This alternate embodiment is somewhat similar to the alternate embodiment of FIGS. 12 and 13 in that it provides an elongated tiller head 230 adapted to till a wider path of ground. However, in this embodiment, there are two separate endless chains 250, 260, oriented in spaced-apart vertical planes. The tiller head 230 of this embodiment includes a horizontal frame housing 232 pivotally mounted on the distal end of outrigger arm 14 by brackets 234 and mounting pin 236. A pair of spaced-apart guide bars 238, 240 are attached to and extend upwardly from the inside end of horizontal frame housing 232 into sliding contact with opposite edges of outrigger arm 14 to maintain the horizontal frame housing 232 in alignment with outrigger arm 14.

This embodiment is provided with two separate hydraulic motors 242, 244 mounted on opposite sides of the distal end of horizontal frame housing 232 with their respective drive shafts 244, 254 facing each other in axial alignment. Drive sprockets 246, 256, respectively, are mounted on drive shafts 244, 254 of motors 242, 252. Two idler sprockets 248, 249 are mounted on a common shaft 249 at the inside end of horizontal frame housing 232 and independently journaled for rotation thereon. Idler sprocket 246, and idler sprocket 258 is positioned in alignment in a common vertical plane with drive sprocket 256. An endless chain 250 is positioned around drive sprocket 246 and idler sprocket 248, and a plurality of teeth 251 extend outwardly therefrom in spaced-apart relation to each other. Likewise, an endless chain 260 is positioned around drive sprocket 256 and idler sprocket 258 in a plurality of teeth 261 are attached to and extend outwardly from chain 260 in spaced-apart relation to each other.

As shown by the arrows 262, 263 in FIG. 15, each chain 250, 260 is driven by its respective hydraulic motor 242, 252 in opposite directions to each other. Therefore, as the tiller apparatus is advanced in a forward motion, one chain 250 moves in one transverse direction shown by arrow 262 pulling the tiller teeth through the ground in that one direction transverse to the forward motion of the tiller apparatus. The second chain 260 moves in the opposite direction 263 transverse to the forward motion of the tiller and drags the teeth through the ground in that opposite direction. Therefore, the ground is tilled once in one transverse direction by one chain 250 and again in the opposite transverse direction by the other chain 260 to result in thorough tilling but insignificant net movement of soil in either direction to leave a level tilled path. The remaining features of the alternative embodiment shown in FIGS. 14 and 15 are substantially the same as those described for the preferred embodiment.

Although the present invention has been described with a certain degree of particularity, it is understood that the present disclosure has been made by way of example and that changes in details and structure may be made without departing from the spirit thereof.

What is claimed is:

1. In tiller apparatus including a tool bar, a rotary tiller tool mounted on said tool bar, and a hydraulic motor for rotating said tiller tool, the improvement comprising:

a double-acting hydraulic cylinder with a piston and rod slideably positioned therein attached to said tool bar to applying forces upwardly and downwardly on the tool bar by hydraulic fluid pressures selectively applied an opposite sides of the piston in the cylinder;

a main circulating hydrauLic fluid circuit for providing circulating hydraulic fluid under pressure to said hydraulic motor and to said hydraulic cylinder, said main circuit including a pressure pump, a reservoir, a suction line for conducting hydraulic fluid from the reservoir to the pump, a pressure line for delivering hydraulic fluid under pressure to the hydraulic motor and to the double-acting cylinder, and a return line for carrying fluid from the motor and the cylinder back to the reservoir, said hydraulic motor and said double-acting cylinder being connected into said main circuit in parallel to each other such that both the motor and the cylinder are adapted to have approximately the same pressure applied thereto in the lines of the main circuit, whereby the forces upwardly and downwardly applied by the cylinder to the tool bar are adapted to vary in direct proportion to the pressure necessary to rotate the tiller tool;

a first branch circuit having two lines connected to said hydraulic motor and to said pressure and return lines, respectively, of the main circuit and first valve means in said first branch circuit for selectively connecting said two lines in the first branch circuit to selected ones of the pressure and return lines in the main circuit, said first valve means including first position means for connecting one of said first branch circuit lines to the pressure line in the main circuit to supply a flow of fluid under pressure to the motor and for connecting the other of said first branch circuit lines the return line of the main circuit to return fluid from the motor to the reservoir, and alternate second position means for isolating the motor from the main circuit pressure line and connecting together the two lines from the motor to the main circuit return line to allow the motor shaft to coast; and a second branch circuit having two lines connected to the pressure and return lines, respectively, of the main circuit and to said hydraulic cylinder, one of which second branch lines is directed to the rod side of the piston and the other of which second branch lines is directed to the opposite side of the piston, and second valve means in said second branch circuit for selectively connecting said two lines in the second branch circuit to selected ones of the pressure and return lines in the main circuit, said second valve means including first position means for connecting one of said lines in the second branch circuit from the cylinder to the main circuit pressure line and for connecting the other of said lines in the second branch circuit to the main circuit return line, and alternate second position means for isolating the double-acting cylinder from the main circuit pressure line and connecting together the two lines from the cylinder to the main circuit return line for a working float condition of the tool with the piston in the double-acting cylinder exposed only to the main circuit return line.

2. The improvement of claim 1, wherein the vertical force components applied to said tool bar by said hydraulic cylinder per unit of pressure in said hydraulic circuit is adjustable variable.

3. The improvement of claim 1, wherein the angle between said hydraulic cylinder and asid tool bar is adjustably variable in such a manner as to effect a variation in the vertical force component applied to said tool bar by said hydraulic cylinder per unit of pressure in said hydraulic circuit.

* * * * *

UNITED STATES PATENT AND TRADEMARK OFFICE
CERTIFICATE OF CORRECTION

PATENT NO. : 4,660,649
DATED : April 28, 1987
INVENTOR(S) : Anderson et al.

It is certified that error appears in the above-identified patent and that said Letters Patent is hereby corrected as shown below:

In column 1, line 48, change "issuued" to --issued--.
In column 2, line 65, change "riller" to --tiller--.
In column 3, line 19, change "cOnnected" to --connected--.
In column 4, line 29, begin "FIG. 7" at a new paragraph.

In column 21, line 53, change "an" to --on--.
In column 21, line 55, change "hydrauLic" to --hydraulic--.
In column 22, line 57, change "asid" to --said--.

Signed and Sealed this

Twenty-sixth Day of April, 1988

Attest:

DONALD J. QUIGG

Attesting Officer

Commissioner of Patents and Trademarks